United States Patent
Beard et al.

(10) Patent No.: US 9,972,146 B1
(45) Date of Patent: May 15, 2018

(54) SECURITY SYSTEM WITH A WIRELESS SECURITY DEVICE

(71) Applicant: Cypress Semiconductor Corporation, San Jose, CA (US)

(72) Inventors: Paul Frank Beard, Bigfork, MT (US); David G. Wright, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days. days.

(21) Appl. No.: 14/751,559

(22) Filed: Jun. 26, 2015

Related U.S. Application Data

(63) Continuation of application No. 14/512,944, filed on Oct. 13, 2014, which is a continuation of application No. 12/948,587, filed on Nov. 17, 2010, now abandoned.

(51) Int. Cl.
*G05B 19/00* (2006.01)
*G07C 9/00* (2006.01)

(52) U.S. Cl.
CPC .......... *G07C 9/00087* (2013.01); *G07C 2009/00095* (2013.01)

(58) Field of Classification Search
CPC . G07C 9/00158; G07C 9/00087; G06F 21/32; B60R 25/252; B60R 2325/101
USPC ................................................. 340/5.52, 5.53
See application file for complete search history.

(56) References Cited

U.S. PATENT DOCUMENTS

| | | | |
|---|---|---|---|
| 7,155,416 B2 | 12/2006 | Shatford | |
| 7,233,789 B2 | 6/2007 | Macor | |
| 7,378,939 B2 | 5/2008 | Sengupta et al. | |
| 2002/0067259 A1 | 6/2002 | Fufidio et al. | |
| 2003/0023882 A1 | 1/2003 | Udom | |
| 2003/0115490 A1* | 6/2003 | Russo et al. | 713/202 |
| 2004/0257202 A1* | 12/2004 | Coughlin | G06F 21/35 340/5.82 |
| 2006/0219776 A1* | 10/2006 | Finn | 235/380 |
| 2006/0290519 A1 | 12/2006 | Boate et al. | |
| 2008/0028230 A1 | 1/2008 | Shatford | |
| 2008/0136585 A1 | 6/2008 | Eskildsen et al. | |
| 2008/0229400 A1 | 9/2008 | Burke | |
| 2008/0278283 A1 | 11/2008 | Slevin | |
| 2008/0316024 A1 | 12/2008 | Chantelou et al. | |

(Continued)

OTHER PUBLICATIONS

USPTO Advisory Action for U.S. Appl. No. 12/948,587 dated Sep. 26, 2013; 3 pages.

(Continued)

*Primary Examiner* — Omer S Khan

(57) ABSTRACT

A device includes a security controller to determine whether a wireless security device is authorized to access at least one resource protected by a secure access device based, at least in part, on identification signals that originate from the wireless security device. The security controller is configured to receive location information corresponding to the wireless security device from at least one wireless device. When the wireless security device is authorized to access at least one resource, the security controller is configured to direct the security access device to disable at least one security measure that restricts user access to the at least one resource based, at least in part, on the location information corresponding to the wireless security device.

20 Claims, 10 Drawing Sheets

(56) References Cited

U.S. PATENT DOCUMENTS

2009/0161922 A1\* 6/2009 Lemke .................. 382/117
2009/0201128 A1\* 8/2009 Campisi ............ G06K 9/00006
                                                        340/5.53
2010/0022217 A1   1/2010 Ketari

OTHER PUBLICATIONS

USPTO Final Rejection for U.S. Appl. No. 12/948,587 dated Jul. 14, 2014; 22 pages.
USPTO Final Rejection for U.S. Appl. No. 12/948,587 dated Jul. 22, 2013; 24 pages.
USPTO Non-Final Rejection for U.S. Appl. No. 12/948,587 dated Feb. 20, 2014; 23 pages.
USPTO Non-Final Rejection for U.S. Appl. No. 12/948,587 dated Mar. 29, 2013; 20 pages.
U.S. Appl. No. 12/948,587: "Security System With a Wireless Security Device," Paul Beard, filed Nov. 17, 2010; 41 pages.
Drahansky, "Biometric Security Systems Fingerprint Recognition Technology", Mar. 30, 2005; 151 pages.
Kurt Marko, "Securing Remote PC Access", http://www.processor.com/articles/PDFMagazine/Good/Pdf.
USPTO Final Rejection for U.S. Appl. No. 14/512,944 dated Apr. 19, 2017; 28 pages.
USPTO Final Rejection for U.S. Appl. No. 14/512,944 dated Oct. 25, 2016; 20 pages.
USPTO Non-Final Rejection for U.S. Appl. No. 14/512,944 dated Jun. 7, 2016; 23 pages.
USPTO Non-Final Rejection for U.S. Appl. No. 14/512,944 dated Dec. 28, 2017; 25 pages.

\* cited by examiner

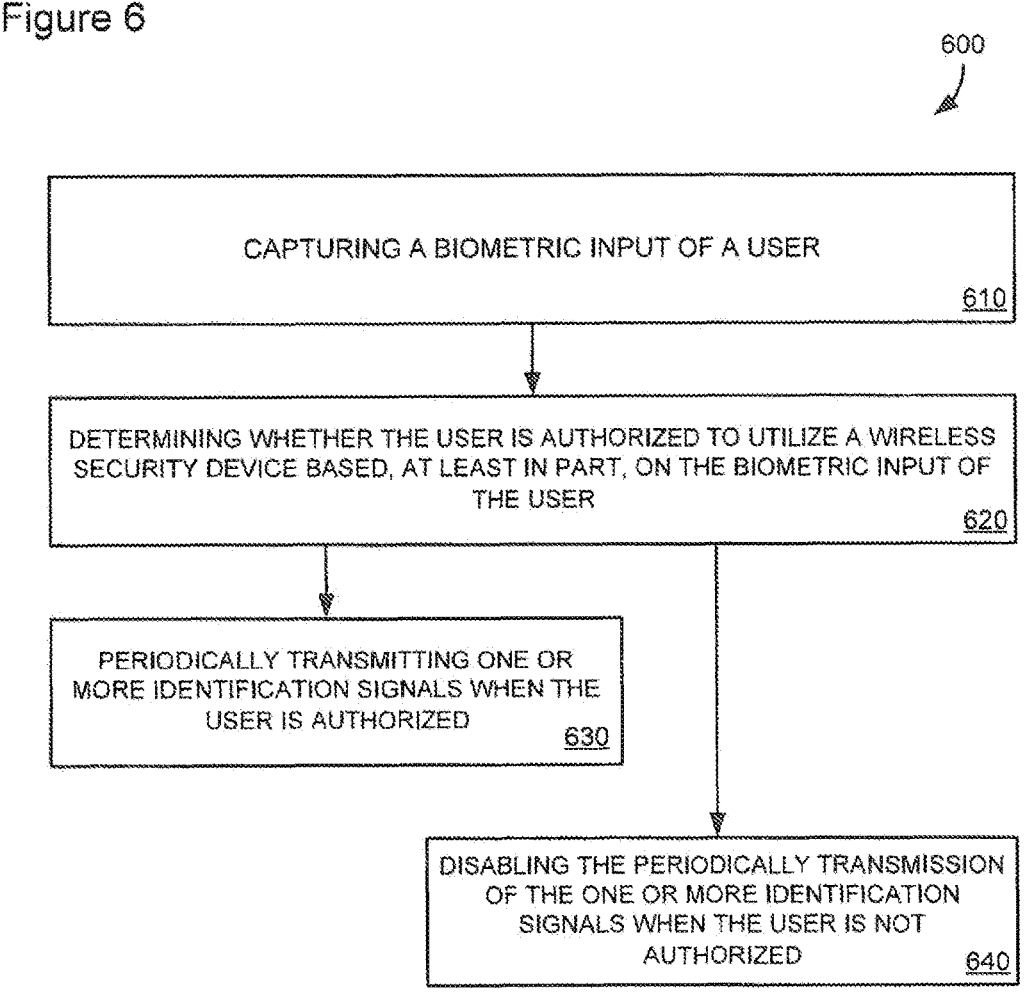

SECURITY SYSTEM WITH A WIRELESS SECURITY DEVICE

CROSS-REFERENCE TO RELATED APPLICATIONS

This application is a continuation of U.S. patent application Ser. No. 14/512,944, filed Oct. 13, 2014 which is a continuation of U.S. patent application Ser. No. 12/948,587, filed Nov. 17, 2010, both of which are incorporated by reference herein in their entirety.

TECHNICAL FIELD

This disclosure relates generally to electronic systems, and, more particularly, to security systems utilizing wireless security devices.

BACKGROUND

Many buildings and offices have security systems that selectively allow personnel admission through their various entrances. These security systems typically have automated locks on their entrances, which can be temporarily deactivated by personnel that are authorized to access the buildings or offices.

Businesses will often issue authorized personnel a personal identification number (PIN) or a pass card, for example, having passive radio-frequency identification (RFID) technology, which can be utilized to gain access to the buildings or offices. The personal identification number, when entered into the security system, or the pass card, when swiped across the security system, will temporarily deactivate or unlock the automated lock for a particular entrance long enough to allow the authorized personnel access to the building or office.

SUMMARY

This patent application discloses a device includes a security controller to determine whether a wireless security device is authorized to access at least one resource protected by a secure access device based, at least in part, on identification signals that originate from the wireless security device. The security controller is configured to receive location information corresponding to the wireless security device from at least one wireless device. When the wireless security device is authorized to access at least one resource, the security controller is configured to direct the security access device to disable at least one security measure that restricts user access to the at least one resource based, at least in part, on the location information corresponding to the wireless security device.

A system includes a secure access device to control access to protected resources and a wireless device to identify a location of a wireless security device in an environment. The system also include a security controller to determine whether the wireless security device is authorized to access at least one resource protected by the secure access device based, at least in part, on identification signals that originate from the wireless security device and the identified location of the wireless security device in the environment.

A wireless security device includes a controller to determine whether a user is authorized to utilize the wireless security device based, at least in part, on a biometric input from the user. The wireless security device also includes a wireless transmitter to automatically emit one or more identification signals when directed by the controller responsive to the determination. A security system is configured to disable at least one security measure that restricts user access to protected resources based, at least in part, on the one or more identification signals and a detected location of the wireless security device.

DESCRIPTION OF THE DRAWINGS

FIG. 6 is an example operational flowchart for the wireless security device and the security system according to embodiments of the invention.

DETAILED DESCRIPTION

Security systems can implement one or more security measures to restrict user access to various protected resources, such as secured equipment or secured areas of a building or office. A wireless security device or key fob can automatically transmit identification signals that, when received by the security system, disable at least one of the security measures. The security system and the wireless security device can also implement multiple techniques to help ensure access to the protected resources is not granted to unauthorized users. Embodiments are shown and described below in greater detail.

Figure 1A:
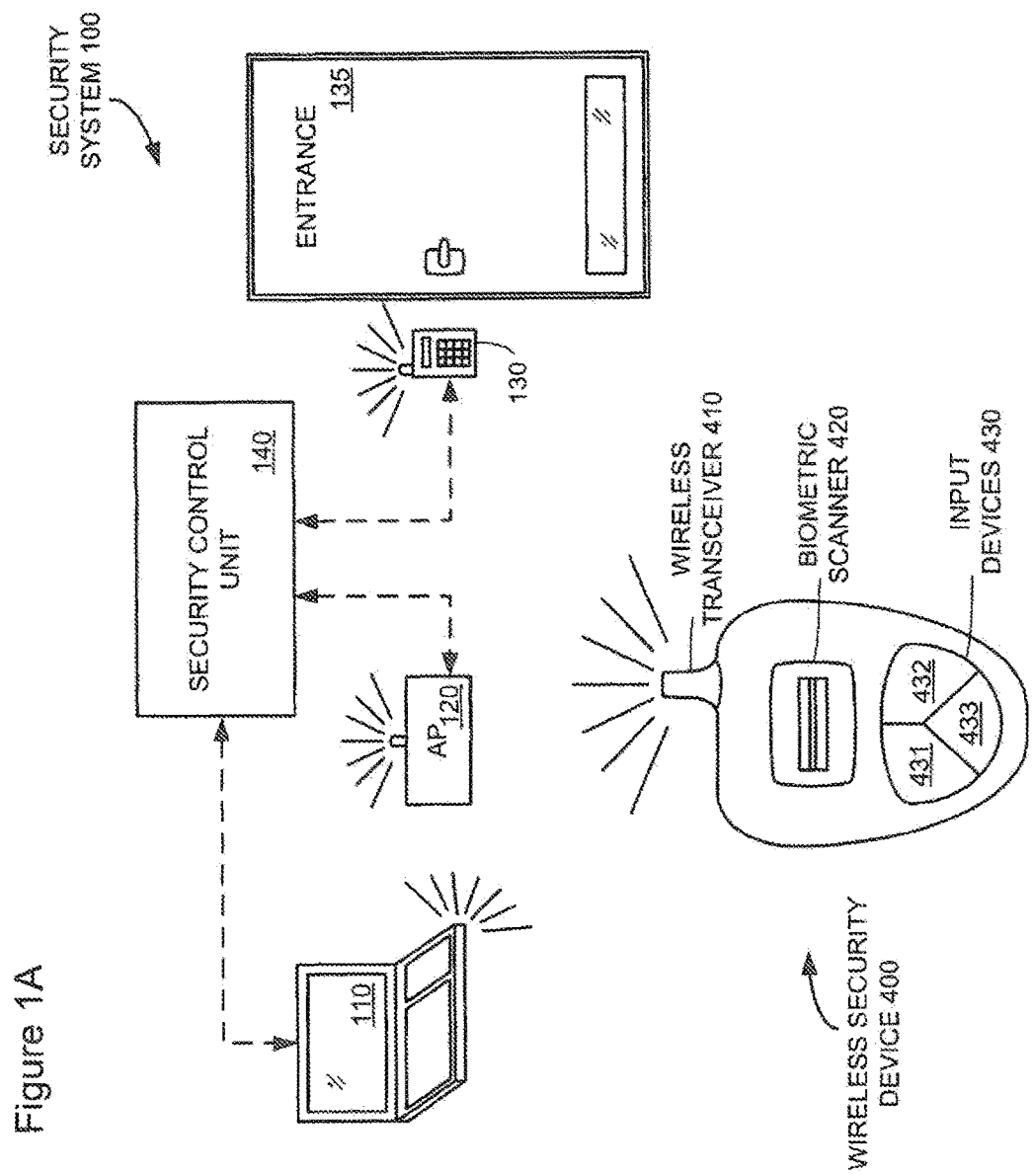
FIGS. 1A-1D are block diagram examples of a security system according to embodiments of the invention.

FIG. 1A is block diagram example of a security system 100 according to embodiments of the invention. Referring to FIG. 1A, the security system 100 includes one or more secure access devices, for example, included in a personal computer 110, an access point 120, an entry device 130, and/or a security control unit 140, which can selectively restrict access to protected resources. For instance, the secure access devices in the personal computer 110 or the access point 120 can authenticate a user, e.g., through a user log-on procedure, before allowing the user to utilize its processing resources. When the entry device 130 includes a secure access device, the entry device 130 can authenticate personal that are authorized to utilize an entrance 135 to a secured area, such as a building or an office.

A wireless security device 400 includes a wireless transceiver 410 that can wirelessly communicate with one or more of the secure access devices and prompt them to disable security measures that restrict access to their protected resources. For example, the wireless security device 400 can transmit or emit identification signals that direct the secure access devices to disable their respective security measures. Although the wireless security device 400 is shown in FIG. 1A as a key fob-type device, in some embodiments, it or the related functionality can be integrated into and/or downloaded onto other electronic devices, e.g., mobile phones or handsets, laptop computers, digital music players, or any other device that can transmit identification signals to the security system 100.

The wireless security device 400, in some embodiments, can periodically transmit the identification signals over a predetermined range from the wireless security device 400. Thus, when the wireless security device 400 travels within the predetermined range of a secure access device, the secure access device can receive the identification signal and disable its corresponding security measure. The length of the delay between transmissions, i.e., the frequency of the periodic transmissions, can be sufficiently short to cause the secure access device to keep the security measure disabled, while the secure access device is within the predetermined range of the wireless security device 400.

The security system 100 can include a security control unit 140 to communicate with one or more of the secure access devices, such as those included in the personal computer 110, the access point 120, and the entry device 130. In some embodiments, the security control unit 140 can be implemented on a server or other network device, and communicate with the secure access devices over one or more networks. The security control unit 140 can provide a centralized location to analyze identification signals from a wireless security device 400 and control the states of the security measures that restrict access to their protected resources. Embodiments of the wireless security device 400 and security system 100 will be described below in greater detail.

In some embodiments, the secure access devices or the security control unit 140 can log access events or attempts to access protected resources. These logging events can track usage of the protected resources, for various reasons including billing or maintenance. Although FIG. 1A shows several example applications that can include secure access devices, it is not meant to be exclusive. In some embodiments, secure access devices can be included in automobiles, controlling security measures, such as car locks and ignition. For example, the secure access devices can automatically unlock car locks, activate an ignition, or allow a user to manual perform these tasks. The secure access devices can be used to control access to security containers, such as safes, file cabinets, safety deposit boxes, realtor lockboxes, mailboxes, utility enclosures for circuit breakers or meters, hotel rooms, trailers, shipping containers, etc.

Figure 1B:
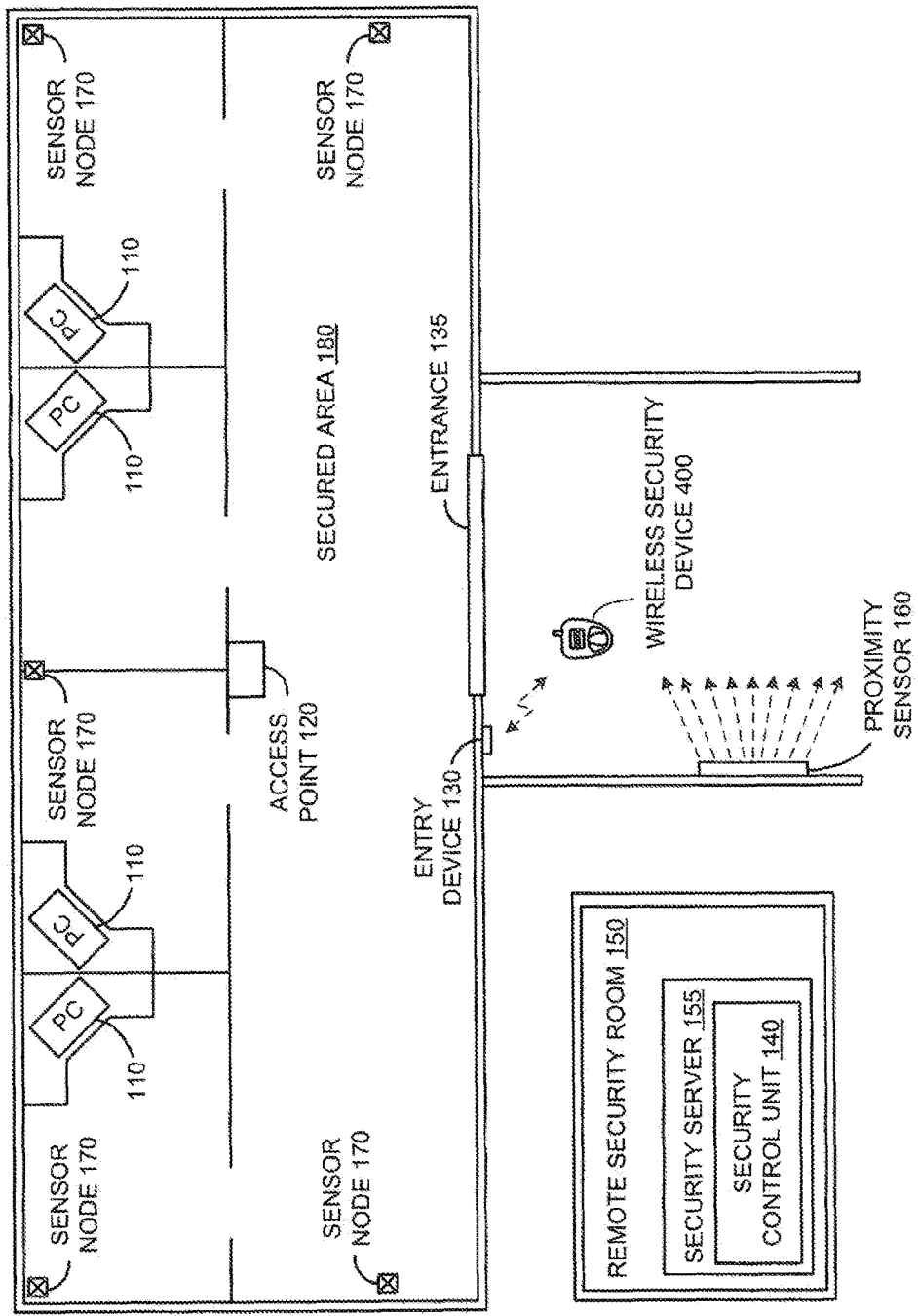
Figure 1C:
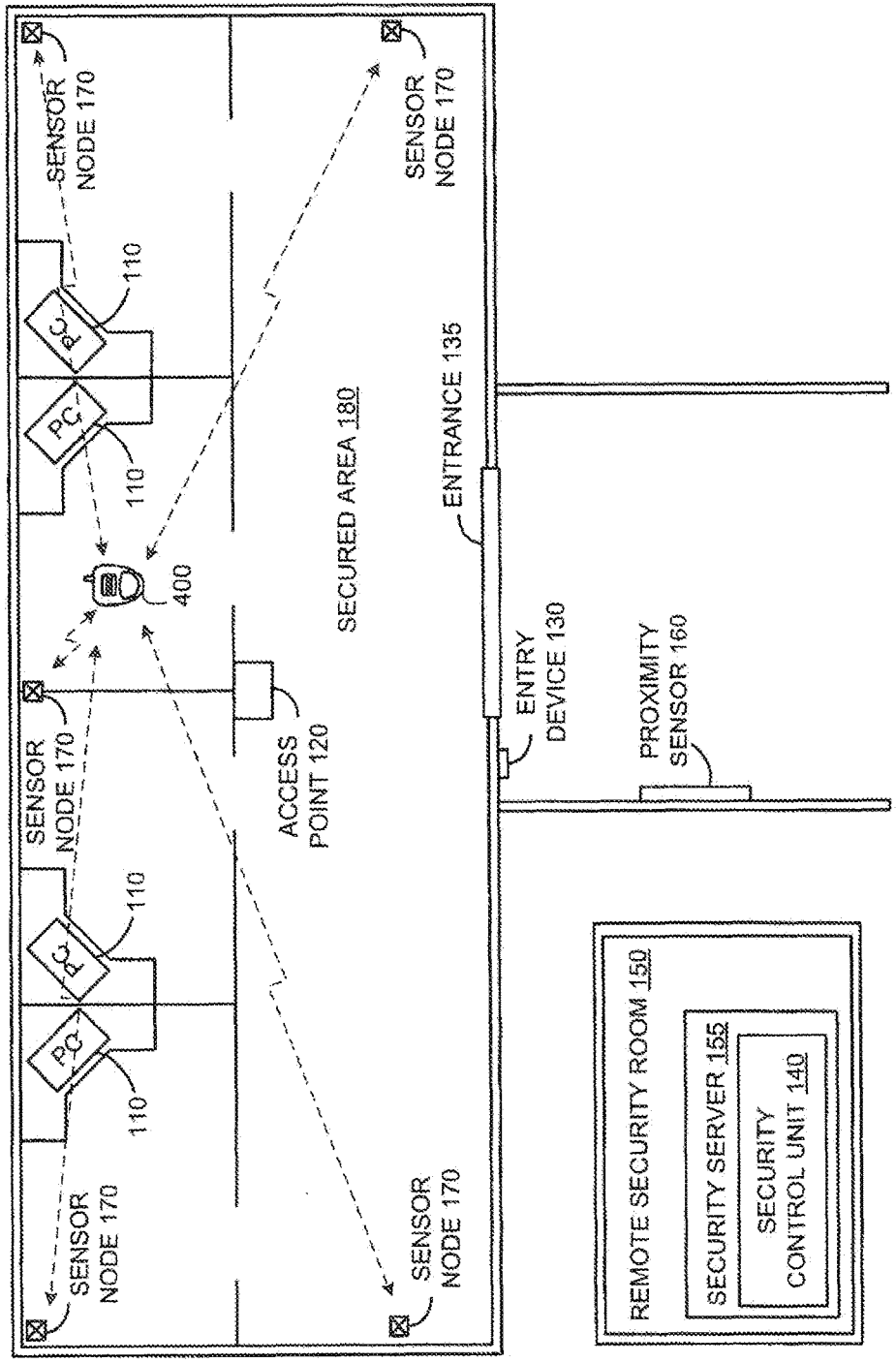
Figure 1D:
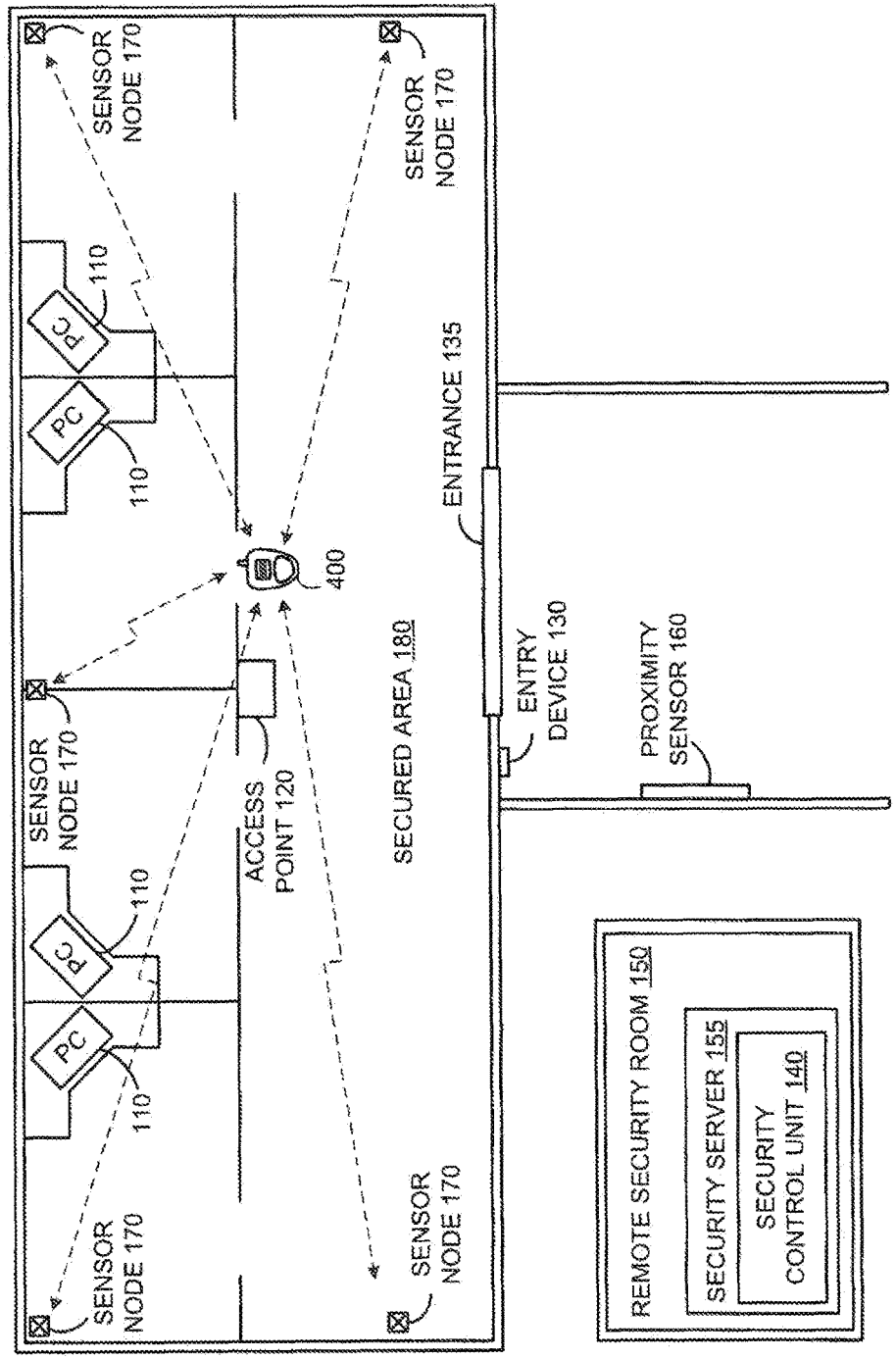

FIGS. 1B-1D are top-views of an example implementation for the security system 100 with the wireless security device 400. Referring to FIGS. 1B-1D, the security system 100 can be utilized to selectively grant access to a secured area 180, for example, through entrance 135, and selectively grant access to secured resources, such as personal computers 110 and access point 120.

The security system 100 can include the security control unit 140, which can be executed on or included in a security server 155. The secured server 155, in some embodiments, can be located in a remote location from the secured area 180, such as in a separate remote security room 150. The remote security room 150 can be on-site, such as in a room or building near the secured area 180, or located off-site and able to communicate with the rest of the security system 100 through one or more networks. The security control unit 140 can communicate with other portions of the security system 100 through a wired or wireless connection directly to the secure access devices of the security system 100, or through one or more intermediary network nodes, such as the access point 120.

Referring to FIG. 1B, the security control unit 140 can control access to the secured area 180 through the entrance 135 via the entry device 130. For example, when the wireless security device 400 has been activated by a user and is within a wireless range of the entry device 130, the entry device 130 can receive identification signals from the wireless security device 400 and forward them to the security control unit 140 for analysis and processing. In some embodiments, the security control unit 140 can determine whether the wireless security device 400 is authorized to access the resource protected by the entry device, e.g., access to the secured area 180 through the entrance 135, and transmit a response to the entry device 130 to indicate whether the entry device 130 is to grant the wireless security device 400 access to the secured area 180 through the entrance 135. This authorization determination can be performed in various ways, for example, by comparing the identification signals received by the entry device 130 to an access list (not shown).

The security system 100 can also include a proximity sensor 160, which can help avert tailgating of multiple users through the entrance 135. The proximity sensor 160 can be an infrared sensor, such as a passive infrared (PIR) sensor, and can detect when an object or person is close to the wireless security device 400. The proximity sensor 160 can transmit a proximity detection signal to the security control unit 140, and the security control unit 140 can determine whether to grant the wireless security device 400 access to the secured area 180 based on the identification signals from the entry device 130 and the proximity detection signal from the proximity sensor 160.

Referring to FIGS. 1C and 1D, the security system 100 can include one or more sensor nodes 170, which can be utilized to detect the location of the wireless security device 400 in the secured area 180. The sensor nodes 170, in some embodiments, can be nodes of a wireless sensor network (WSN) having location-finding capabilities, for example, 802.15.4a, Zigbee Pro, and other network systems built on standard wireless sensor network technologies, such as 104.15.4. In some embodiments, the wireless sensor network can be used for environmental monitoring and control, such as HVAC and lighting control, as well as, detecting a location of the wireless security device 400.

The sensor nodes 170, in some embodiments, can each measure a distance to the wireless security device 400 and report those distances to the security control unit 140 or directly to a secured access device, such as the personal computers 110 or the access point 120. The security control unit 140 or the secured access device can determine a location of the wireless security device 400 within the secured area 180 based on the distance measurements from the sensor nodes 170, and in some embodiments, a distance measurement from the secure access devices themselves.

The secure access devices, such as the personal computers 110 and the access point 120, can receive identification signals from the wireless security device 400 and forward them to the security control unit 140 for analysis and processing. The security control unit 140 can transmit a response to the secure access devices, such as the personal computers 110 and the access point 120, based on the identification signals and the location of the wireless security device 400 in the secured area 180. For example, when the location of the wireless security device 400 is determined to be within a predetermined location of the secured area 180, such as within a specified office or cubicle in the secured area 180, the security control unit 140 can transmit the response to the secure access device to grant access to the protected resource.

After access has been granted to the protected resource, the security control unit 140 can determine the location of the wireless device 400 in the secured area 180. This location determination can be made continually, periodically, intermittently, randomly, or when prompted by another device in the security system 100, for example, upon detection of movement in the wireless security device 400. In some embodiments, the secure access device can signal the security control unit 140 when the wireless security device 400 fails to provide an identification signal after access has been granted, indicating that the wireless security device 400 is out-of-range of the secure access device. The wireless security device 400 can also internally detect motion or movement, and signal the secure access device and/or the security control unit 140 to prompt a location determination of the wireless security device 400. The security system 100 can also include one or more motion sensors (not shown) that can detect motion within the secured area 180 and prompt a location determination of the wireless security device 400 responsive to detecting the motion. When the wireless security device 400 is detected as being outside of a predetermined location in the secured area 180, the security control unit 140 can signal the personal computer 110 to revoke access to the protected resource, for example, by logging-out the user.

Figure 2A:
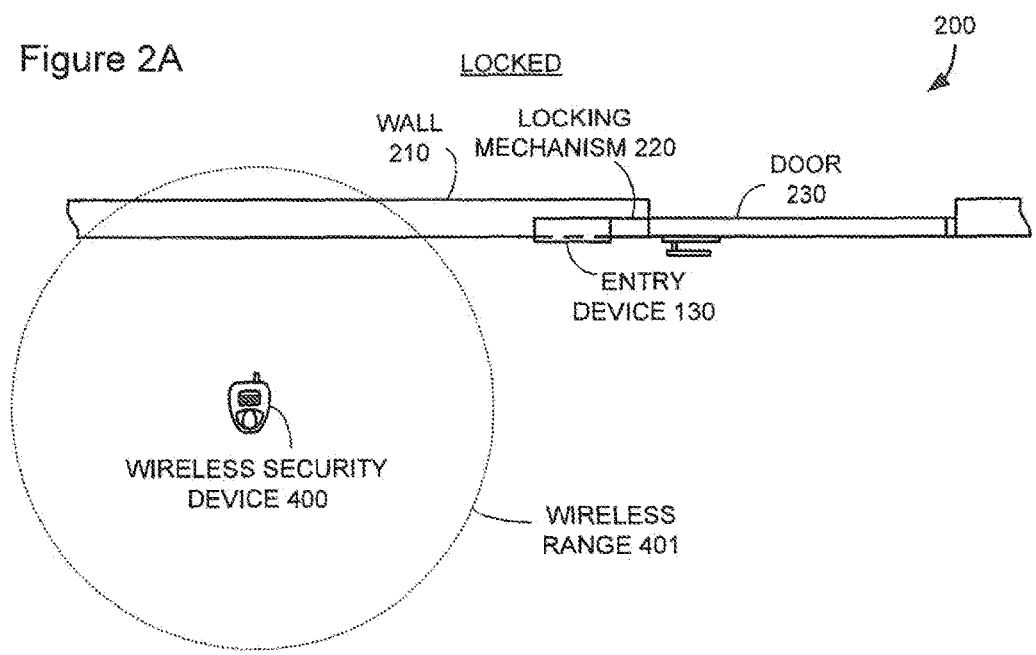
FIGS. 2A-2B and 3A-3B are block diagram examples for utilizing the wireless security device shown in FIG. 1A.
Figure 2B:
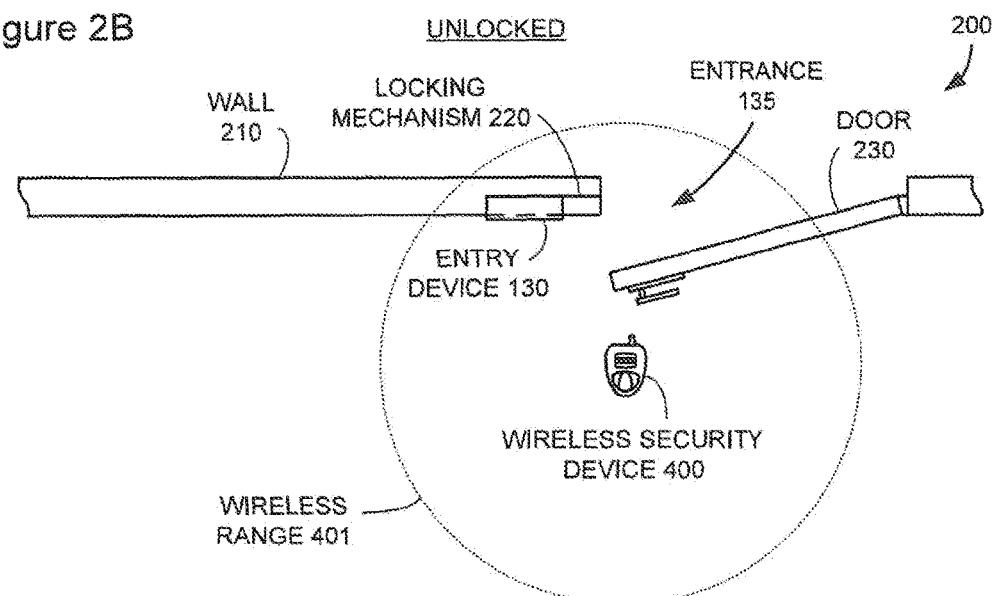

FIGS. 2A-2B and 3A-3B are block diagram examples for utilizing the wireless security device 400 shown in FIG. 1A. Referring to FIGS. 2A and 2B, the wireless access device 400 can transmit identification signals over a wireless range 401. In some embodiments, the wireless access device 400 can control the magnitude or size of the wireless range 401, for example, by varying the transmit signal strength of the wireless transceiver 410. Although the wireless range 401 is shown as substantially spherical or circular, in some embodiments, the wireless transceiver 410 of the wireless security device 400 can be directional—projecting wireless signals in a specific direction from the wireless security device 400.

The security system 100 includes the entry device 130 and a locking mechanism 220, which can be at least partially housed within a wall 10. The wall 10 can also define an entrance 135 and support a door 230 to restrict access to through the entrance 135, for example, when the door 230 is coupled to the locking mechanism 220. The entry device 130 can control the locking mechanism 220 to lock or unlock the door 230, which selectively grants access to the entrance 135, in response to wireless signals from the wireless security device 400. Although FIGS. 2A and 2B, show a door 230 as restricting access through the entrance 135, in some embodiments, any object that can restrict access to the entrance 135 responsive to the entry device 130 and locking mechanism 220.

As shown in FIG. 2A, when the entry device 130 is not within the wireless range 401 of the wireless security device 400, the locking mechanism 220 can lock the door 230 and deny access through the entrance 135. In FIG. 2B, when the wireless security device 400 travels towards the entry device 130 and the entry device 130 is within the wireless range 401 of the wireless security device 400, the entry device 130 can direct the locking mechanism 220 to unlock the door 230, granting access through the entrance 135. For example, when the entry device 130 is within the wireless range 401, the entry device 130 can receive identification signals from the wireless security device 400 that prompt the entry device 130 to have the locking mechanism 220 unlock the door 230. In some embodiments, the door 230 can open automatically responsive to the entry device 130, while in other embodiments, an unlock door 230 can be manually opened by a user attempting to pass through the entrance 135.

In some embodiments, the entry device 130 can include a proximity sensor (not shown) to help avert tailgating of multiple users through the door 230. The proximity sensor can be an infrared sensor, such as a passive infrared (PIR) sensor, and can detect when multiple users are close to the door 230. When multiple users are close to the door 230, the entry device 130 can provide an alert, such as an audible or visual presentation, that indicates to the users that too many users are near the door 230. The entry device 130 can also disable access through the entrance 135 until the excess users move away from the door 230 based on the detection by the proximity sensor.

Figure 3A:
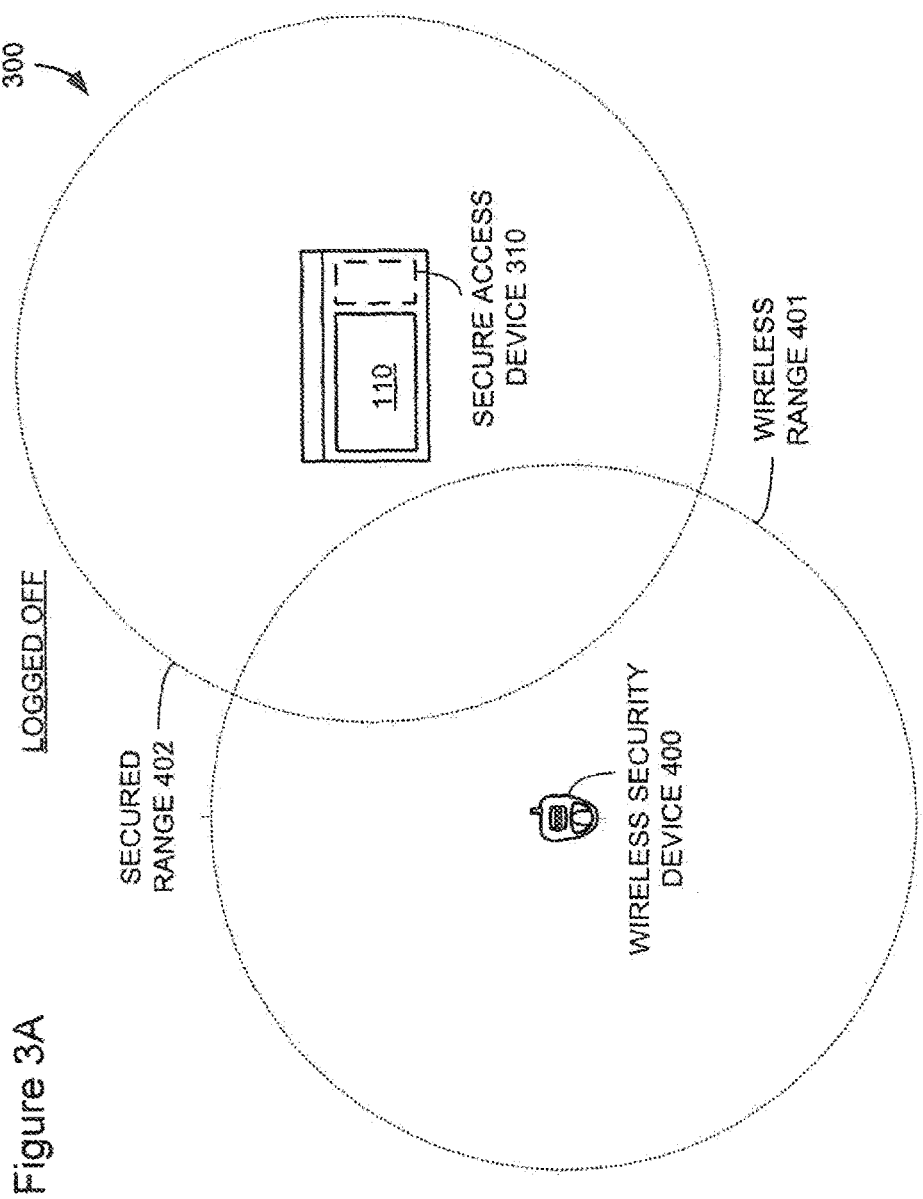
Figure 3B:
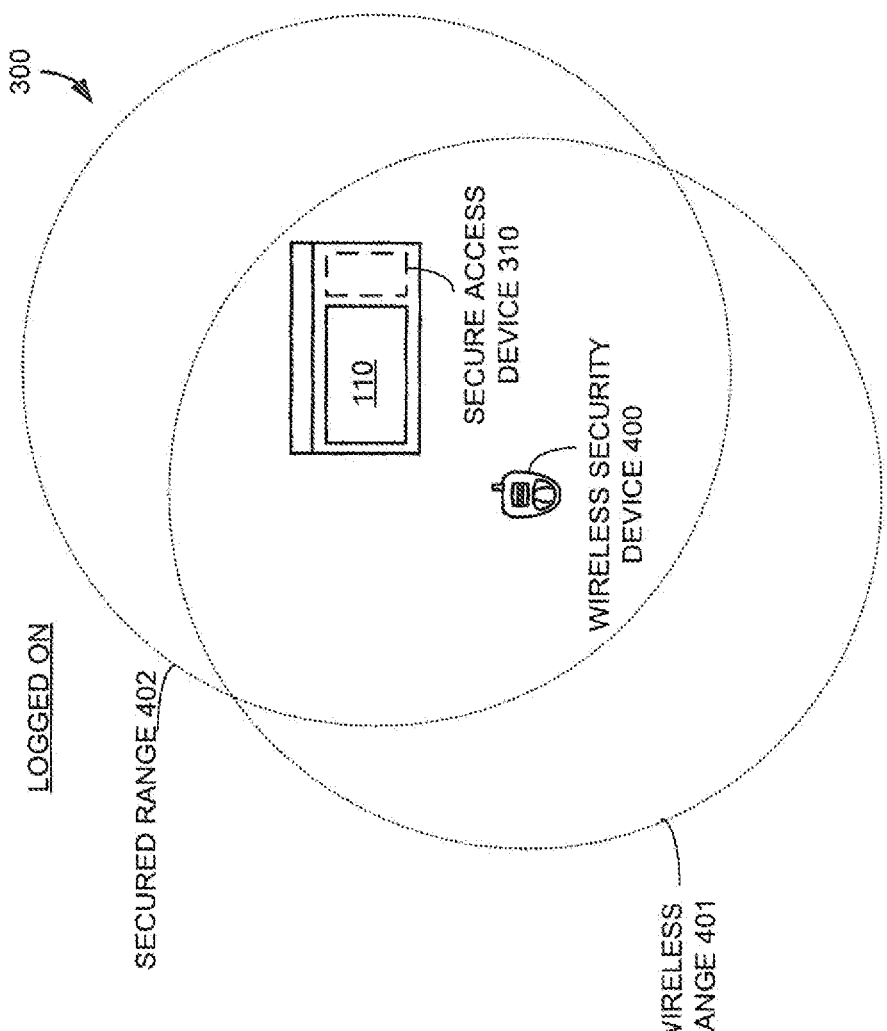

Referring to FIGS. 3A and 3B, similar to as shown in FIGS. 2A and 2B, the wireless access device 400 can transmit identification signals over a wireless range 401. The security system 100 includes a personal computer 110 having a secure access device 310 to restrict or provide access to at least some of the functions and/or resources of the personal computer 110.

In FIG. 3A, when the personal computer 110 is not within the wireless range 401 of the wireless security device 400, the secure access device 310 can restrict access to at least some of the functions and/or resources of the personal computer 110. The wireless range 401 can be a maximum distance wireless signals are detectable from the wireless security device 400. For example, the secure access device 310 can force one or more users to be logged off of the personal computer 110 when the wireless security device 400 is out-of-range of the secure access device 310. In some embodiments, when the personal computer 110 is not within the wireless range 401 of the wireless security device 400, the secure access device 310 can elect to not automatically provide access to the personal computer 110.

In some embodiments, the secure access device 310 can also have a secure range 402. When the wireless security device 400 is not within the secure range 402 of the secure access device 310, the secure access device 310 can restrict access to at least some of the functions and/or resources of the personal computer 110. Since, in some embodiments, the secure access device 310 can receive wireless signals from the wireless security device 400 when the wireless security device 400 is outside of the secure range 402, the secure access device 310 may elect to provide access based on a location of the wireless security device 400.

There are several ways the secure access device 310 can detect the location of the wireless security device 400. The secure access device 310 can implement a wireless link with the wireless security device 400 and detect a distance the wireless security device 400 is from the secure access device 310 based on a signal strength analysis of the wireless link. For instance, the secure access device 310 can measure a strength of wireless signaling with the wireless security device 400 to detect a distance the wireless security device 400 is from the secure access device 310. In some embodiments, the wireless link between the secure access device 310 and the wireless security device 400 can utilize multiple frequency bands, such as 300-400 MHz UHF, 800 MHz and 2.4 GHz bands, and measure the signal strength on each frequency, possibly several times in each direction, to provide an accurate measurement of the distance between the secure access device 310 and the wireless security device 400.

In some applications, such as in when an environment has adjoining workstations or cubicles, the distance the wireless security device 400 is from the secure access device 310 is less important than the actual location of the wireless security device 400 within the environment. When the secure access device 310 can have access to multiple receivers located in the environment, as shown and described above in FIGS. 1B-1D, the location of the wireless security device 400 in the environment can be detected. The multiple receivers, in some embodiments, can be nodes of a wireless sensor network (WSN) having location-finding capabilities, for example, 802.15.4a, Zigbee Pro, and other network systems built on standard wireless sensor network technologies, such as 104.15.4. In some embodiments, the wireless sensor network can be used for environmental monitoring and control, such as HVAC and lighting control, as well as, detecting a location of the wireless security device 400.

The multiple receives, in some embodiments, can each measure a distance to the wireless security device 400 and report those distances to the secure access device 310 or to the security control unit 140. The secure access device 310 or the security control unit 140 can determine a location of the wireless security device 400 based on the distance measurements from the multiple receivers and optionally the secure access device 310. When the location of the wireless security device 400 is determined to be within the secure range 402 of the secure access device 310, the secure access device 310 can grant the wireless security device 400 access to the personal computer.

In some embodiments, the wireless security device 400 can communicate with the secure access device 310 and/or security control unit 140 over the wireless sensor network. For example, the initial challenge to the wireless security device 400 can be issued over the wireless sensor network and location determined using the wireless sensor network, but, in some embodiments, additional authentication of the wireless security device 400 can take place over another wireless network, such as WiFi.

In FIG. 3B, when the secure access device 310 is within the wireless range 401 of the wireless security device 400 and/or the wireless security device 400 falls within the range of the secure range 402 of the secure access device 310, the secure access device 310 can grant user access to at least some of the functions and/or resources of the personal computer 110. For example, the secure access device 310 can direct the personal computer 110 to automatically log-on at least one user. In some embodiments, identification signals from the wireless security device 400 can identify a particular user that is associated with the wireless security device 400 and the secure access device 310 can automatically log-on that particular user.

In some embodiments, when the secure access device 310 is within the wireless range 401 of the wireless security device 400, the secure access device 310 can remove a login lock. For example, the secure access device 310 can assert the login lock and deny one or more users the opportunity to log-on to the personal computer 110. The login lock can disable various peripherals of the personal computer 110, such as a keyboard, mouse, display device, video interface, etc. After the secure access device 310 is within the wireless range 401 of the wireless security device 400, the secure access device 310 can provide the user the opportunity to manually log-on to the personal computer 110. The secure access device 310 can also remove the login lock for all users or for particular users, such as those users associated with the wireless security device 400.

In some embodiments, when the secure access device 310 is within the wireless range 401 of the wireless security device 400, the secure access device 310 can allow a logged-on user access to particular resources of personal computer 110 that would not be accessible to the logged-on user without the presence of the wireless access device 400. For example, the secure access device 310 can restrict user access to secure data, particular programs and applications, or other resources available to the personal computer 110, while allowing the user to log-on to the personal computer 110 and access to other programs, applications, resources, and data.

Figure 4:
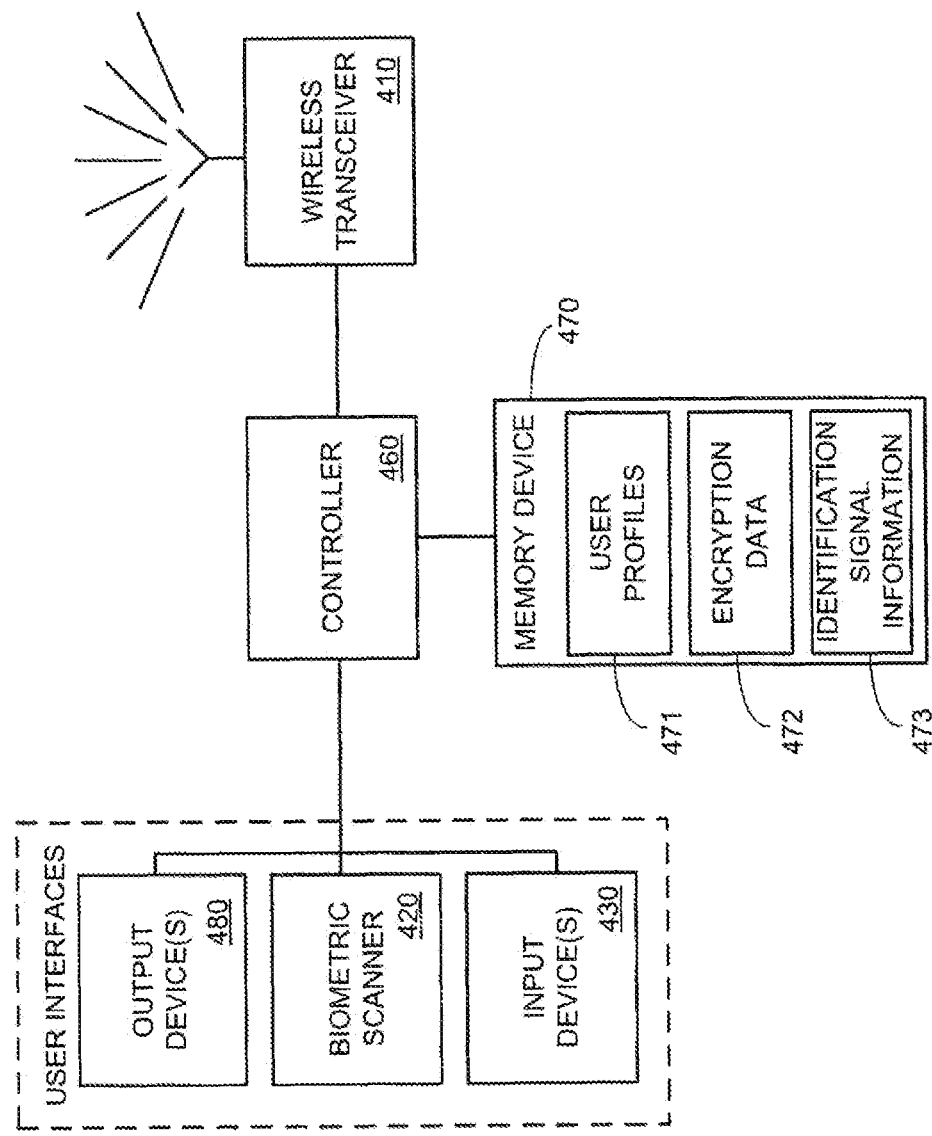
FIG. 4 is a block diagram example of the wireless security device shown in FIG. 1A.

Referring back to FIG. 1A and to FIG. 4, which includes a block diagram example of the wireless security device 400 shown in FIG. 1A. The wireless security device 400 includes various features that help to protect the security system 100 from unauthorized user access, for example, by authenticating users attempting to utilize the wireless security device 400 and/or by protecting the wireless communication between the wireless security device 400 and the security system 100.

The wireless security device 400 can authenticate a user of the wireless security device 400, for example, by including a biometric scanner 420 to scan at least a part of a user or detect a behavior of the user for the biometric input. In some embodiments, the biometric scanner 420 can be a fingerprint scanner, iris or retina scanner, a bodily fluid scanner, voice recognition system, or any other device that can identify a unique physical and/or behavioral attribute of the user.

The wireless security device 400 can receive a biometric input from the biometric scanner 420 and compare the biometric input to one or more known user profiles 471. In some embodiments, the user profiles 471 can be stored in a memory device 470 of the wireless security device 400. The wireless security device 400 can include a controller 460 to receive the biometric input from the biometric scanner 420, access the memory device 470 to locate the user profiles 471, and compare the biometric input to the user profiles 471. In some embodiments, the user profiles 471 may be stored in the security control unit 140, and the wireless security device 400 may send encrypted biometric data to the security control 140 unit for verification.

When the biometric input matches one or more of the known user profiles 471, the wireless security device 400 can become activated, for example, to emit identification signals. The controller 460 can generate the identification signals, for example, from identification signal information 473 stored in the memory device 470. The identification signals can be signals that are common to multiple wireless devices, device-specific signals, and/or user-specific signals. After receiving a biometric input that matches a user profile 471, the wireless security device 400 can remain active indefinitely or for a predetermined period of time. In some embodiments, the security system 100 can signal the wireless security device 400 to become disabled, which can override previous user activation.

When the biometric input fails to match at least one of the user profiles 471, the wireless security device 400 can become disabled, for example, by blocking the wireless transceiver 410 from sending or receiving signals. In some embodiments, the wireless security device 400 can remain disabled until the biometric scanner 420 provides the wireless security device 400 a biometric input that matches a known user profile 471.

The wireless security device 400, in some embodiments, includes motion detection functionality (not shown), that can detect movement of the wireless security device 400 or of objects nearby the wireless security device 400. After receiving a biometric input that matches a known user profile 471, the wireless security device 400 can remain active based on the input received from the motion detection functionality. For example, the wireless security device 400 can become disabled when the wireless security device 400 is moved after a period of inactivity. In another example, the wireless security device 400 can remain activated while in motion, but become disabled, after coming to rest for a preset period of time.

The wireless security device 400, in some embodiments, includes proximity detection functionality (not shown), that can detect the presence of a user near the wireless security device 400. The proximity detection functionality can include capacitive sensing and/or infrared sensing, for example, a passive infrared (PIR) sensor, which can detect the presence of a user near the wireless security device 400. After receiving a biometric input that matches a known user profile 471, the wireless security device 400 can remain active based on the input received from the proximity detection functionality. For example, the wireless security device 400 can become disabled when proximity detection functionality detects the wireless security device 400 is separated from the user.

When the wireless security device 400 is utilized in conjunction with the wireless sensor network described above, the wireless security device 400 can remain active based on a detected location of the wireless security device 400 in the environment covered by the wireless sensor network. For example, when the wireless security device 400 leaves the area covered by the wireless sensor network, the wireless security device 400 can become disabled.

In some embodiments, the wireless security device 400 can take additional defensive actions when the biometric input fails to match one or more of the known user profiles and/or after the wireless security device 400 has been inactive to a predetermined period of time. For example, the wireless security device 400 can store the biometric input that failed to match the known user profiles 471, for example, in the memory device 470. This stored biometric input can subsequently be transferred to the security system 100, for example, through the wireless transmitter 410.

The wireless security device 400 can destroy stored data, such as the known user profiles 471, encryption data 472, and identification signal information 473, when the biometric input fails to match one or more of the known user profiles 471 and/or after the wireless security device 400 has been inactive to a predetermined period of time. The destruction of data helps to ensure information utilized by the wireless security device 400 to gain access to protected resources is not compromised if the wireless access device 400 is mislaid or stolen.

When the biometric input fails to match one or more of the known user profiles 471 and/or after the wireless security device 400 has been inactive to a predetermined period of time, the wireless access device 400 can transmit the alert signal through the wireless transceiver 410. The alert signal is configured to indicate to the security system 100 that the wireless security device 400 may be in possession of an unauthorized user. The security system 100, in response to the alert signal, can shut down access to the protected resources for all users or for the particular wireless security device 400.

The security system 100 can identify the location that one or more of the secure access devices received the alert signal, allowing security personal to attempt to locate the wireless security device 400. When the wireless security device 400 has access additional networks, for example, a local area network (LAN), such as a WiFi network, a cellular network, a wide area network (WAN), an 802.16 (Wimax) network, a Free Space Optical (FSO) network, or other voice or data networks, and/or include global positioning system (GPS) functionality, the wireless access device 400 can transmit the alert signal over the additional networks, in attempt to alert the security system 100 of the attempted unauthorized access.

The wireless security device 400 can attempt to secure the communication with the security system 100 in several ways. For example, the wireless security device 400 can encrypt the identification signals before they are transmitted or emitted from the wireless security device 400. In some embodiments, the controller 460 can access the encryption data 472 in the memory device 470 and generate the identification signals based on the encryption data 472.

The wireless security device 400 can vary the wireless frequency over which the identification signals are transmitted. In some embodiments, the identification signal information 473 in the memory device 470 can indicate which wireless frequency for the wireless transceiver 410 to transmit the identification signals. The frequency variation can be performed based on the day, time, or other temporal indicator. For example, the wireless security device 400 can emit identification signals over one wireless frequency or channel during normal business hours, and another wireless frequency during off hours. The frequency variation can also be based on the specific wireless security device 400 and/or the user of the wireless security device 400.

As discussed above, the wireless security device 400 can periodically transmit the identification signals, which can also be utilized as a basis for authenticating the wireless security device 400. The wireless security device 400 can vary the periodicity or frequency of the transmission based on temporal indicators, such as time and/or day, or based on the wireless security device 400 and/or user of the wireless security device 400. In some embodiments, the identification signal information 473 in the memory device 470 can indicate the delay between identification signal transmissions.

The security system 100 can be configured to receive the identification signals and authenticate the wireless security device 400 based on the contents of the identification signal and the mode of communication, e.g., which wireless frequency was utilized for transmission or the period of the identification signal transmissions. The security system 100 can also determine if the same or similar identification signals were received on other wireless frequencies, indicating a counterfeit device may be attempting access by transmitting the identification signals on all channels or wireless frequencies.

In some embodiments, the wireless security device 400 can be activated, but hold-off transmitting identification signals until the wireless security device 400 is within range of a secure access device of the security system 100. For example, the secure access device can emit a proximity signal that, when received by the wireless security device 400, prompts the wireless security device 400 to begin transmitting the identification signals. This limits where the wireless security device 400 transmits the identification signals, and helps to avoid eavesdropping on the identification signals by unauthorized users. In some embodiments, the proximity signal emitted by the security system 100 can have the same or similar security features as those discussed above with the identification signals, such as being encrypted and having varied wireless frequency and transmission periodicity.

To help reduce power consumption, the wireless security device 400, when activated, can periodically transmit a "ping" signal to initiate a user authentication session. The ping signal can be short wireless signal, for example, a radio frequency signal that can be detected and discriminated from noise and/or interfering signals. In some embodiments, the ping can include a unique data sequence and can be the same for all wireless security devices 400, or can have characteristics that are unique to a particular wireless security device 400 or a group of wireless security devices 400. The secure access device can receive the ping and respond with a request to begin the authentication process with the wireless security device 400.

The wireless security device 400 and the security system 100 can also perform an initial handshake or exchange of signals or datagrams to ensure the wireless security device 400 is authentic. The handshake can be initiated by either the wireless security device 400 or the security system 100 and can include a request by the security system 100 for a unique response. The wireless security device 400 can generate the unique response based on the information in the request from the security system 100, and possibly information stored in the wireless security device 400 and/or the mode of communicating the request, such as the wireless transmission frequency. The security system 100 can analyze the unique response received from the wireless security device 400 to determine whether the wireless security device 400 is authentic. The security system 100 can also periodically and/or intermittently request a follow-up handshake for additional security.

In some embodiments, the wireless security device 400 can include multiple wireless transceivers that can be utilized to implement the different stages of authentication processes—initiation, location detection, and authentication. For example, as discussed above, initiation of the authentication process by either the wireless security device 400 or the secure access device can utilize a wireless transceiver that has low-power consumption to help save battery life. To help the secure access device determine a location of the wireless security device 400, the wireless access device 400 may utilize a different wireless transceiver, for example, that can communicate with a wireless sensor network. Finally during authentication, the wireless security device 400 can utilize yet another wireless transceiver that allows for additional security or encryption, for example, that can communicate over a WiFi network. In some embodiments, any of these wireless transceivers can be utilized for any of the different stages of authentication processes.

The security system 100 can also include the security control unit 140, which can allow for an additional layer of defense against unauthorized access. The security control unit 140 can communicate with one or more of the secure access devices, such as those included in the personal computer 110, the access point 120, and the entry device 130. The security control unit 140 can provide a centralized location to analyze identification signals from the wireless security device 400 and control the states of the security measures that restrict access to their protected resources.

By centralizing the authentication of the wireless security device 400, the security system 100 can secure any information utilized in determining when identification signals are received from an authentic wireless security device 400. For example, the security control unit 140 can be stored in a secured room within a building or at a remote location, and thus a theft of a personal computer 110, the access point 120, and the entry device 130, may not compromise any access information utilized to allow the user of the wireless security device 400 access to protected resources.

The centralized authentication of the wireless security device 400 can also allow for layered security. The security control unit 140 would be able to tell when a wireless security device 400 was currently accessing one protected resource and attempting to access another protected resource in a physically distinct regions or spaces. For instance, when the wireless security device 400 is currently accessing the personal computer 110 located in an office and also attempting to access the building, the security control unit 140 can determine at least one of the accesses is being performed by a counterfeit device.

The wireless security device 400 can include input devices 430 that allow a user to manually activate, disable, or send an alert, for example, by actuating buttons 431-433, respectively. In some embodiments, the manual activation, disablement, and/or alert can be achieved when the user has already been authenticated through the biometric input process described, and/or by actuating the buttons 431, 432, and/or 433 in a predetermined pattern. Although FIG. 1A shows the input devices 430 as a set of buttons, in some embodiments, the input devices 430 can be a touch screen device, a roller ball or mouse device, audio recognition device, or any other device that allows a user to present a manual input to the wireless security device 400.

The wireless security device 400 can include output devices 480 to provide visual and/or audio indications to the user of the wireless security device 400. The visual and/or audio indications can identify a state of the wireless security device 400, such as whether it is activated or disabled, and/or actively transmitting identification signals or alert signals. The visual and/or audio indications can also be utilized to help a user locate a missing device, for example, by presenting an auditory sound or ring. The output devices 480 can include lights, speakers, visual displays, or any other visual and/or audio device that can provide an output perceptible by the user.

Figure 5:
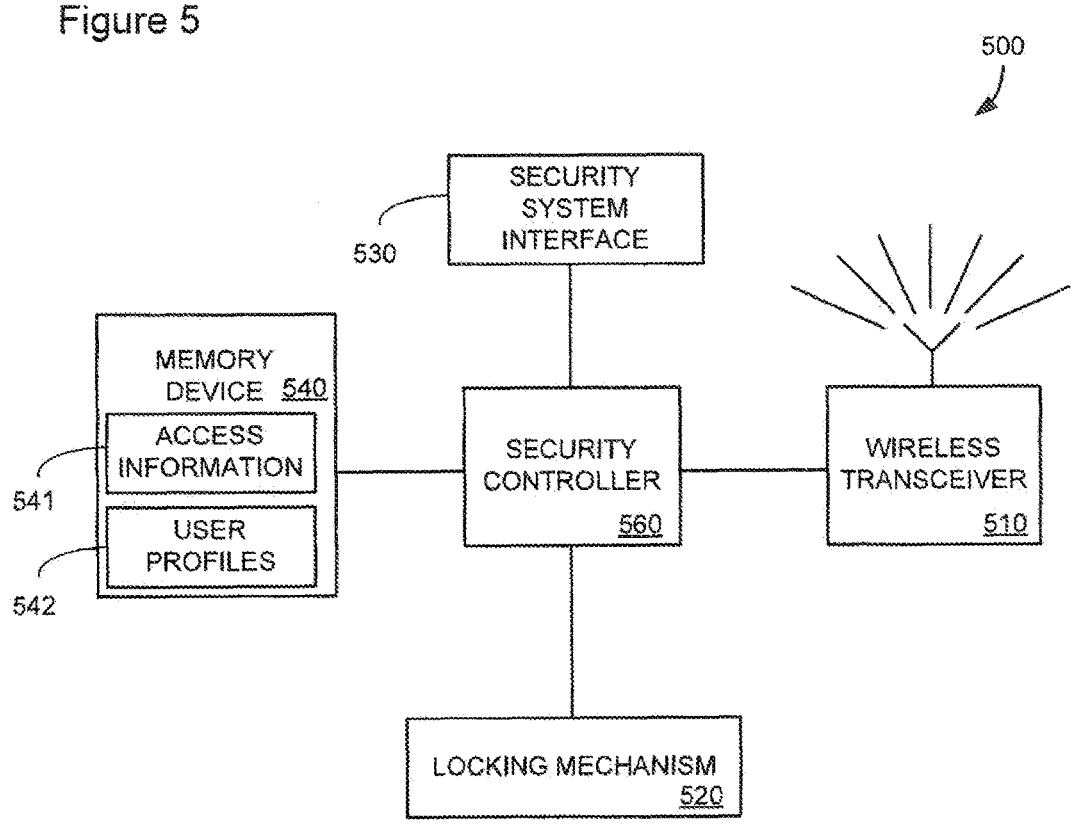
FIG. 5 is a block diagram example of the secure access device according to embodiments of the invention.

FIG. 5 is a block diagram example of the secure access device 500 according to embodiments of the invention. Referring to FIG. 5, the secure access device 500 includes a wireless transceiver 510 to exchange wireless signals with one or more wireless security devices 400. The wireless transceiver 510 can pass received wireless signals along to a security controller 550 for analysis.

The security controller 550 can analyze received wireless signals based, at least in part, on information stored in the memory device 540. The security controller 550 can utilize the access information 541 and possibly the user profiles 542 to determine whether the wireless signals received by the wireless transceiver 510 authenticate a wireless security device 400 within range of the secure access device 500. In some embodiments, the security controller 550 can forward the received signals to another device, such as the security control unit 140, through the security system interface 530 for analysis.

The access information 541 can include information on an expected format of the wireless signals, and an expected mode of communication, e.g., the frequency of the wireless signals and the delay between the periodic transmissions. The user profiles 542 can include information on particular users or classes of users that can access or that are denied access to resources protected by the secure access device 500. The classes of users can be a subset or group of one or more users that have common access privileges, which can be set arbitrarily or based on some common characteristic.

When the wireless signals indicate that the wireless security device 400 is authentic, the security controller 550 can direct the locking mechanism 520 to disable one or more security measures. For example, when the locking mechanism 520 is locking an access point 120, the locking mechanism 520 can enable the access point 120 to provide access to a network to at least the user associated with the wireless security device 400.

FIG. 6 is an example operational flowchart 600 for the wireless security device and the security system according to embodiments of the invention. Referring to FIG. 6, in a first block 610, the wireless security device 400 can be configured to capture a biometric input of a user. In some embodiments, the wireless security device 400 can include a biometric scanner 420 to capture the biometric input of a user. The biometric scanner 420 can be a fingerprint scanner, iris or retina scanner, a bodily fluid scanner, voice recognition system, or any other device that can identify a unique physical and/or behavioral attribute of the user.

In a next block 620, the wireless security device 400 can be configured to determine whether the user is authorized to utilize the wireless security device 400 based, at least in part, on a biometric input of the user. In some embodiments, the wireless security device 400 can be configured to authorize the user to utilize the wireless security device when the biometric input at least substantially matches one or more predefined user profiles stored in the wireless security device 400.

In a next block 630, the wireless security device 400 can be configured to periodically transmit one or more identification signals when the user is authorized. The one or more identification signals can be configured to prompt a security system 100 to disable at least one security measure that restricts user access to resources protected by the security system 100. The security system 100 can be configured to automatically re-engage the at least one security measure when the security system 100 is outside a transmission range of the wireless security device 400.

In a next block 640, the wireless security device 400 can be configured to disable the wireless security device 400 from periodically transmitting the one or more identification signals when the user is not authorized to utilize the wireless security device 400. In some embodiments, the wireless security device 400 can transmit one or more alert signals instead of the identification signals. The alert signals can be configured to prompt the security system 100 to lock access to the protected resources for the wireless security device 400.

One of skill in the art will recognize that the concepts taught herein can be tailored to a particular application in many other ways. In particular, those skilled in the art will recognize that the illustrated embodiments are but one of many alternative implementations that will become apparent upon reading this disclosure.

The preceding embodiments are examples. Although the specification may refer to "an", "one", "another", or "some" embodiment(s) in several locations, this does not necessarily mean that each such reference is to the same embodiment(s), or that the feature only applies to a single embodiment.

The invention claimed is:

1. A method of accessing a protected resource, the method comprising:
   capturing a biometric input of a user with a biometric sensor incorporated in a mobile phone;
   comparing the biometric input with one or more user profiles stored in the mobile phone;
   in response to the biometric input matching one of the one or more user profiles in the mobile phone, performing operations comprising:
      authorizing the user to utilize the mobile phone; and
      periodically transmitting identification data from the mobile phone to an apparatus comprising a secure access device using a wireless transceiver in the mobile phone, when the user is authorized to utilize the mobile phone;
      providing the user with access to one or more protected resources of the apparatus in response to the biometric input; and
      automatically re-engaging at least one security measure of the apparatus when the mobile phone is outside a transmission range of the wireless transceiver.

2. The method of claim 1, wherein capturing the biometric input comprises capturing a scan of a fingerprint.

3. The method of claim 1, wherein capturing the biometric input comprises capturing a scan of an iris or retina.

4. The method of claim 1, wherein transmitting the identification data using the wireless transceiver comprises transmitting data over a cellular network.

5. The method of claim 1, wherein transmitting the identification data using the wireless transceiver comprises transmitting data over a wifi network.

6. The method of claim 1, wherein providing the user with access to the one or more protected resources comprises disabling at least one security measure that restricts access to the one or more protected resources.

7. The method of claim 1, wherein providing the user with access to the one or more protected resources comprises providing the user with access to a computer system.

8. The method of claim 1, wherein providing the user with access to the one or more protected resources comprises controlling at least one of a lock and an ignition of an automobile.

9. The method of claim 1, further comprising logging the access to the one or more protected resources by the secure access device, wherein logging the access is used for billing.

10. A mobile phone comprising:
   a biometric scanner integrated into the mobile phone;
   a memory device for storing one or more user profiles;
   a wireless transceiver; and
   a controller coupled to the biometric scanner, the memory device and the wireless transceiver, the controller configured to compare a biometric input received by the biometric scanner with the one or more user profiles, to authorize a user to utilize the mobile phone, and to periodically transmit identification data to an apparatus comprising a secure access device using the wireless transceiver when the user is authorized to utilize the mobile phone, wherein the secure access device is configured to provide the user with access to one or more protected resources of the apparatus in response to the biometric input and to automatically re-engage at least one security measure of the apparatus when the mobile phone is outside a transmission range of the wireless transceiver.

11. The mobile phone of claim 10, wherein the biometric scanner comprises a fingerprint scanner.

12. The mobile phone of claim 10, wherein the biometric scanner comprises a voice recognition device.

13. The mobile phone of claim 10, wherein the biometric scanner comprises an iris or retina scanner.

14. The mobile phone of claim 10, wherein the apparatus comprises an automobile, and the secure access device is configured to control a lock or an ignition of the automobile.

15. The mobile phone of claim 10, wherein the secure access device is configured to control access to a room or building.

16. The mobile phone of claim 10, wherein the secure access device is configured to control access to a computer system.

17. A system comprising:
   a secure access device configured to provide a user with access to one or more protected resources of the system in response to identification information transmitted to the secure access device by using a wireless transceiver in a mobile phone and to automatically re-engage at least one security measure of the system when the mobile phone is outside a transmission range of the wireless transceiver, wherein the mobile phone comprises a biometric scanner, a memory device and a controller configured to compare a biometric input with one or more user profiles stored in the memory device, to authorize the user to utilize the mobile phone, and to periodically transmit the identification information using the wireless transceiver in the mobile phone in response to the biometric input when the user is authorized to utilize the mobile phone.

18. The system of claim 17, wherein the biometric scanner comprises a fingerprint scanner.

19. The system of claim 17, wherein the system comprises an automobile, and the secure access device is configured to control a lock or an ignition of the automobile.

20. The system of claim 17, wherein the system comprises a computer system, and the secure access device is configured to control access to the computer system.

\* \* \* \* \*